United States Patent
Chen

(10) Patent No.: US 9,008,413 B2
(45) Date of Patent: Apr. 14, 2015

(54) PROCESSING METHOD FOR A PAIR OF STEREO IMAGES

(75) Inventor: Chien-Ming Chen, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 273 days.

(21) Appl. No.: 13/587,171

(22) Filed: Aug. 16, 2012

(65) Prior Publication Data

US 2013/0108149 A1    May 2, 2013

(30) Foreign Application Priority Data

Oct. 27, 2011   (TW) .............................. 100139198 A

(51) Int. Cl.
*G06K 9/00*    (2006.01)
*G06T 5/00*    (2006.01)
*G06T 5/50*    (2006.01)
*G06T 7/00*    (2006.01)

(52) U.S. Cl.
CPC . *G06T 5/002* (2013.01); *G06T 5/50* (2013.01); *G06T 7/0075* (2013.01); *G06T 2207/10012* (2013.01)

(58) Field of Classification Search
None
See application file for complete search history.

(56) References Cited

U.S. PATENT DOCUMENTS

| 7,876,954 | B2* | 1/2011 | Kim et al. ...................... 382/154 |
| 2002/0061131 | A1* | 5/2002 | Sawhney et al. .............. 382/154 |
| 2007/0024614 | A1* | 2/2007 | Tam et al. ...................... 345/419 |
| 2007/0286476 | A1* | 12/2007 | Kim et al. ...................... 382/154 |
| 2008/0044079 | A1* | 2/2008 | Chao et al. ..................... 382/154 |
| 2010/0142824 | A1* | 6/2010 | Lu .................................. 382/195 |
| 2013/0009952 | A1* | 1/2013 | Tam et al. ...................... 345/419 |

FOREIGN PATENT DOCUMENTS

| TW | 200810814 A | 3/2008 |
| TW | 201044317 A | 12/2010 |

OTHER PUBLICATIONS

TW Office Action dated Jan. 27, 2014, 8 pages.

* cited by examiner

*Primary Examiner* — Amir Alavi
*Assistant Examiner* — Alexander J Lesnick
(74) *Attorney, Agent, or Firm* — Edell, Shapiro & Finnan, LLC

(57) ABSTRACT

A processing method for a pair of stereo images is provided. The method includes: extracting a pair of edge images from the stereo images, each edge image having edge pixels, each edge pixel of one of the edge images being associated with an overlap record and a disparity record; providing a plurality of image lateral shifts to sequentially determine a plurality of overlap levels between the pair of edge images; and updating the overlap record and the disparity record associated with a selected edge pixel to a maximum overlap level and a most-likely disparity, respectively. The maximum overlap level is a maximum among a plurality of associated overlap levels to which the selected edge pixel contributes. The most-likely disparity corresponds to the maximum overlap level.

9 Claims, 7 Drawing Sheets

PROCESSING METHOD FOR A PAIR OF STEREO IMAGES

This application claims the benefit of Taiwan Patent Application Serial No. 100139198, filed Oct. 27, 2011, the subject matter of which is incorporated herein by reference.

BACKGROUND OF THE INVENTION

1. Field of the Invention

The invention relates in general to a processing method for a pair of stereo images, and more particularly to a stereo image processing method capable of simplifying a computation process.

2. Description of the Related Art

Different images of an object perceived by both human eyes give an observer a sense of distance between the object and the observer. Similarly, a so-called pair of stereo images are a pair of two-dimensional (2D) images of an environment or a target object respectively obtained from two different positions along a line. Information of another dimension may be obtained by appropriately processing the pair of 2D images. That is, distance information of objects in the images may be obtained to generate a three-dimensional (3D) image. For example, 3D images may be utilized in monitoring equipment or an interactive television game device to identify an object position in front of a camera.

To obtain a 3D image from a pair of 2D stereo images, disparity information of the 2D stereo images is needed. For example, supposing a pair of 2D images are respectively left and right images captured by left and right cameras, the disparity of a closer object with respect to the left and right images is greater than the disparity of a farther object. Thus, generating a 3D image involves theoretically identifying the disparity of each pixel of one of two 2D images, or generating a disparity map formed by a plurality of disparities corresponding to the pixels.

However, in the prior art, complicated computations and large amounts memory or number of registers are required for generating a disparity map. For example, a conventional method for determining a disparity of a pixel in a left image is first defining a predetermined range around the pixel as a source image window. Next, from a right image, among a plurality of destination image windows corresponding to all the disparities of the pixel, a destination image window most similar to the source image window is identified. The disparity between the most similar destination image window and the source image window is the disparity corresponding to the pixel. Computations involved in such a conventional approach are significant. Although certain improved methods have been proposed, e.g., a method disclosed by U.S. Pat. No. 7,876,954, computations required for realizing the improved methods are still quite sizable.

SUMMARY OF THE INVENTION

According to an embodiment of the present disclosure, a processing method for a pair of stereo images is provided. The pair of stereo images comprise a source image comprising a plurality of source pixels, and a destination image comprising a plurality of destination pixels. The processing method comprises: determining from the source image a plurality of source key pixels having a key characteristic; determining from the destination image a plurality of destination key pixels having the key characteristic; providing a plurality of overlap levels and a plurality of disparities associated with the source key pixels; sequentially identifying a plurality of overlap levels between the source image and the destination image for a plurality of image lateral shifts, each image lateral shift having a corresponding overlap level; and updating the disparity record and the overlap record of a selected key pixel to a most-likely disparity and a maximum overlap level. The selected key pixel is selected from the source key pixels. The maximum overlap level is a maximum among a plurality of associated overlap levels to which the selected key pixel contributes. The most-likely disparity corresponds to the maximum overlap level.

According to another embodiment of the present disclosure, a processing method for a pair of stereo image is provided. The processing method comprises: extracting a pair of edge images from the pair of stereo images, each edge image comprising a plurality of edge pixels, each edge pixel of one of the edge images being associated with an overlap record and a disparity record; providing a plurality of image lateral shifts, and sequentially identifying a plurality of overlap levels between the pair of edge images; and updating the disparity record and the overlap record of a selected edge pixel to a most-likely disparity and a maximum overlap level. The maximum overlap level is a maximum among a plurality of associated overlap levels to which the selected edge pixel contributes. The most-likely disparity corresponds to the maximum overlap level.

The above and other aspects of the invention will become better understood with regard to the following detailed description of the preferred but non-limiting embodiments. The following description is made with reference to the accompanying drawings.

DETAILED DESCRIPTION OF THE INVENTION

In an embodiment below, a source image is an image from a pair of stereo images having a pixel whose disparity is to be determined, whereas the other stereo image is a destination image. It should be noted that terms in naming the images are examples rather than limiting the present disclosure thereto. In another embodiment, the terms for naming the two images may be exchanged.

Pixels in the source image are referred to as source pixels, and pixels in the destination image are referred to as destination pixels. In an embodiment, each source pixel and each destination pixel respectively have RGB or YCbCr color information.

Computations required for determining the disparity corresponding to each of the source pixels inevitably sum up to a tremendous amount. Further, disparities of certain source pixels are difficult to determine or even meaningless. For example, the exact disparity of a source pixel right in the middle of a large monochromatic block is difficult to determine. Therefore, in an embodiment of the present disclosure, only disparities of particular key pixels (to be referred to as source key characters) in the source image are determined to reduce a significant amount of computations. In an embodiment, the so-called key pixel in a source or destination image is an edge pixel identified as being located at an edge of an object, and shall be referred to as an edge pixel in the description below. In other embodiments, the key pixel may have other characteristics.

Figure 1:
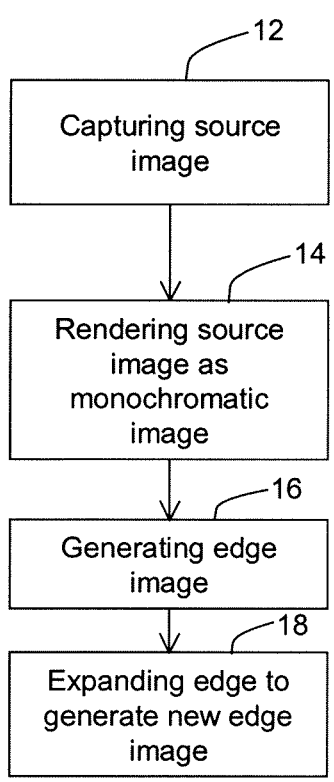
FIG. 1 shows preparatory operations before determining a disparity map of a source image FIGS. 2A to 2D respectively show a corresponding image generated by the steps in FIG. 1
Figure 2A:
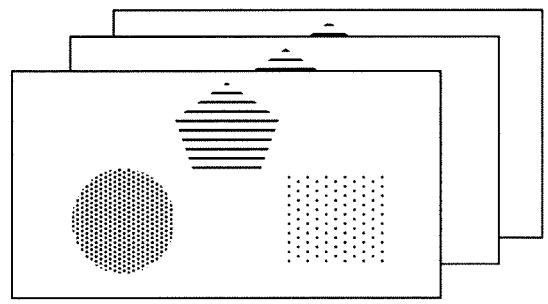
Figure 2B:
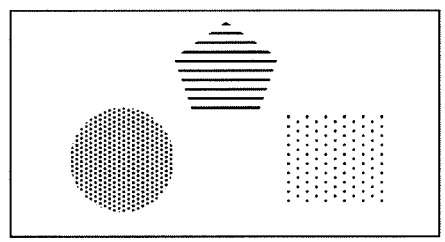
Figure 2C:
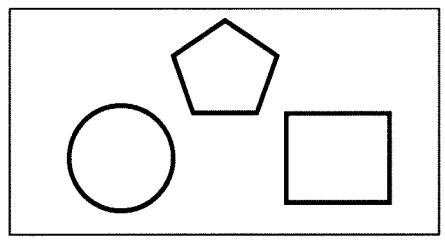
Figure 2D:
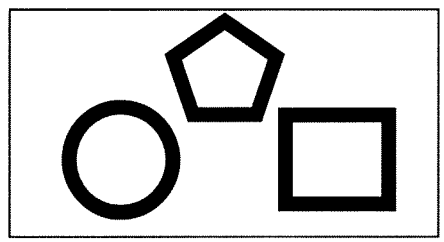

FIG. 1 shows preparatory operations before determining a disparity map of a source image. FIGS. 2A to 2D respectively show a corresponding image generated by the steps in FIG. 1. Preparatory operations of the destination image may also be similarly deduced from illustrations of FIGS. 1 and 2A to 2D. Step 12 comprises capturing the source image by a camera. For example, the generated source image has YCbCr color information, as shown in FIG. 2A. At this point, the source image is consisted of a Y image, a Cb image and a Cr image. Step 14 comprises keeping information of one color of the source image. For example, only the Y image of the source image or only color information of the grayscale is kept, as shown in FIG. 2B. Other color information is not taken into consideration in the subsequent process of determining the disparity in order to simplify the computations. Step 16 comprises generating an edge image according to the monochromatic source image, as shown in FIG. 2C. For example, edge pixels in the source image are identified through differentiation to generate an edge image. In an embodiment, Step 18 comprises expanding of edge of the edge image to generate a new edge image. For example, neighboring source pixels located within a predetermined distance from the currently identified edge pixels are also defined as edge pixels, and the edge image is accordingly updated, as shown in FIG. 2D.

Figure 3:
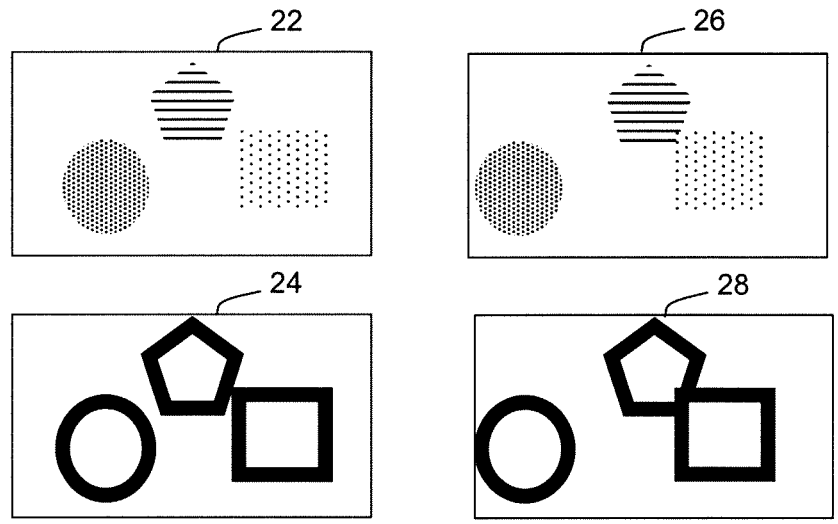
FIG. 3 shows four images generated from the preparatory operations.

Referring to FIG. 3, after the preparatory operations, four images are generated—a monochromatic source image 22, a source edge image 24, a monochromatic destination image 26, and a destination edge image 28. A pentagon, a circle and a rectangle in the source image 22 and the destination image 26 are monochromatic but with different grayscales or color depths. Each edge image comprises a plurality of edge pixels. From FIG. 3, it can be roughly inferred that the circle is closest to the camera, and the pentagon, being located at almost a same position in the source image and in the destination image, is located farthest away from the camera.

Figure 4A:
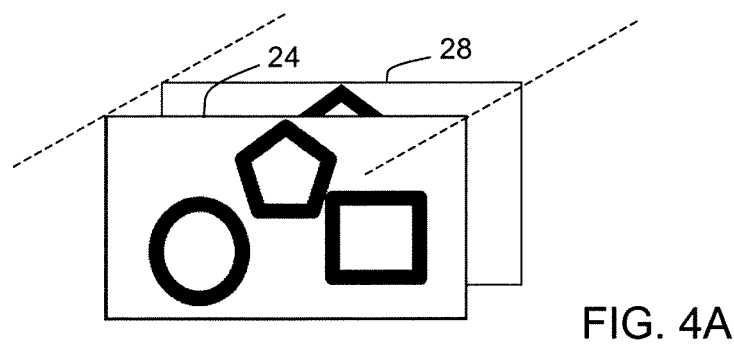
FIGS. 4A and 4B respectively show relationships when an image lateral shift between a source edge image 24 and a destination edge image 28 is 0 and S.
Figure 4B:
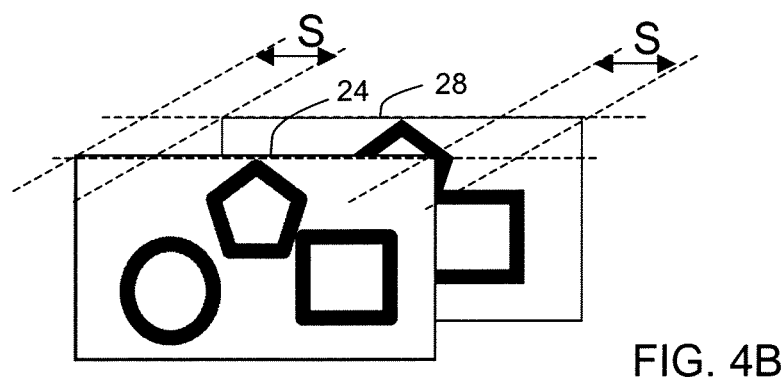

FIGS. 4A and 4B respectively show relationships when an image lateral shift between the source edge image 24 and the destination edge image 28 is 0 and S. In an embodiment, for a lateral shift, an overlap level between the source edge image 24 and the destination edge image 28 is calculated. Taking FIG. 4A for example, when the lateral shift is 0, an overlap level between the source edge image 24 and the destination image 28 may be a pair of overlapping edge pixels, which approximately falls at a sum of the number of edge pixels at sides of the pentagon, some edge pixels of the rectangle and few edge pixels of a circumference of the circle. For example, there are a total of 80 pairs of overlapping pixels to indicate an overlap level of 80. In another more appropriate and stricter approach for defining the overlapping pixels, apart from a pair of edge pixels occurring at a same position when an image is laterally shifted, it is necessary that color characteristics corresponding to the two edge pixels be similar in order to be recognized as a pair of overlapping pixels that can be accounted for the overlap level.

Figure 5:
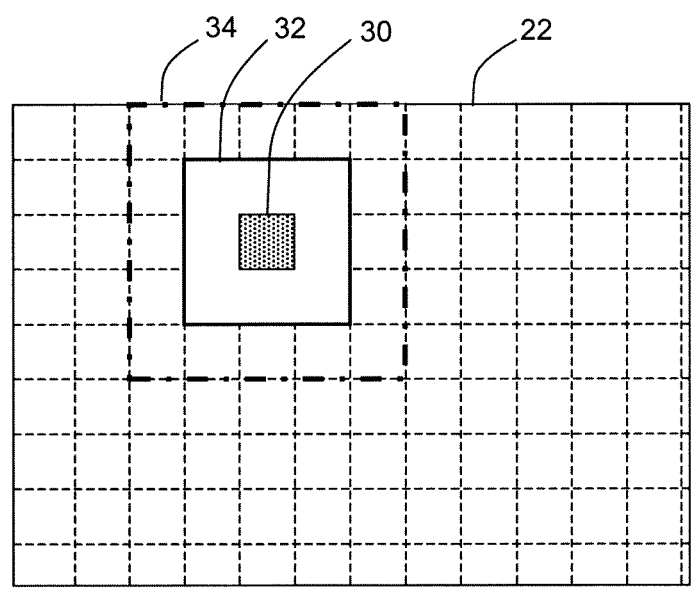
FIG. 5 is a schematic diagram of an area in which a color characteristic of an overlapping pixel is to be determined.

FIG. 5 shows a schematic diagram of an area in which a color characteristic of an overlapping pixel is to be determined. In an embodiment, the color characteristic of an overlapping pixel 30 is a grayscale of a corresponding image pixel (e.g., in the source image 22 or the destination image 28). In another embodiment, the color characteristic of the overlapping pixel 30 is a grayscale average of corresponding image pixels within a predetermined neighboring area around the overlapping pixel 30. The predetermined area, being determined to adapt to actual requirements, may be an area 32 comprising 9 pixels, an area 34 comprising 25 pixels, or areas in other shapes and sizes.

More simply, in an embodiment, an overlap level of a laterally shifted image is the number of overlapping pixel pairs with correspondingly similar color characteristics occurring at same positions in the target destination edge image 28 after laterally shifting the source edge image 24. Therefore, different image lateral shifts may generate different numbers of overlapping pixel pairs to generate a corresponding overlap level. It is deduced from the above description that each overlap level is maximum a total number of the source edge pixels.

Taking adjusting a lens focal length of a camera for example, changing an image lateral shift is equivalent to adjusting a lens focal length, and a corresponding overlap level generated is equivalence to an image clarity outputted by the lens focal length. For a highest image clarity, distances between objects occurring in the clear image or objects contributing to the image clarity are substantially associated with the lens focal length corresponding to the highest image clarity. For example, a distance between a lens and a captured person is substantially associated with a lens focal length rendering a most clear image of the person in the camera. Based on similar principles, different overlap levels respectively generated by different image lateral shifts are first calculated, and a maximum among the associated overlap levels to which an edge pixel contributes are identified. The image lateral shift corresponding to the maximum is then defined as a disparity of the edge pixel, wherein the disparity corresponds to a distance between the camera and a corresponding object contributing to the edge pixel in space.

Figure 6:
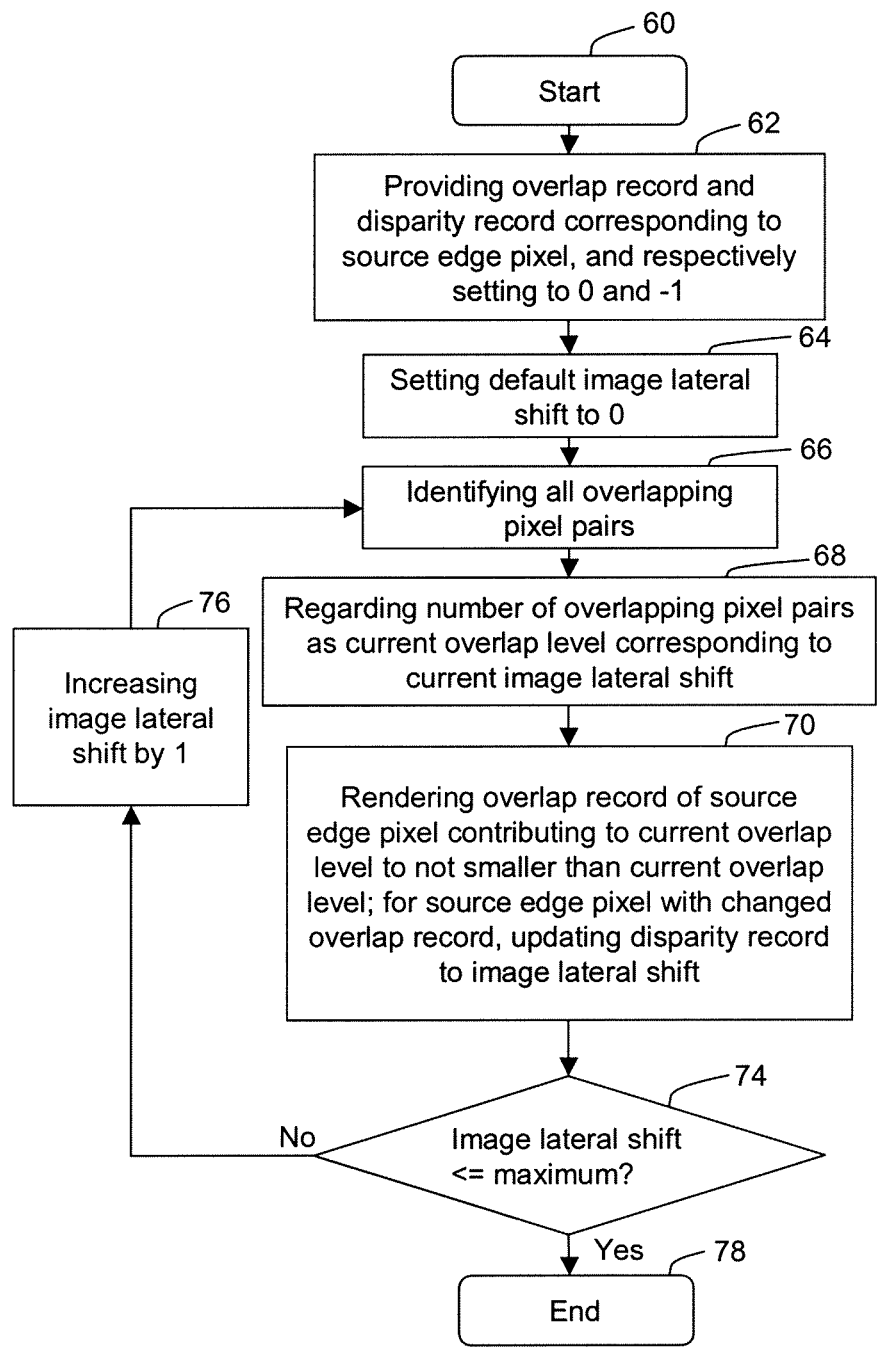
FIG. 6 is a flowchart of a method according to an embodiment of the present disclosure.

FIG. 6 shows a method according to an embodiment of the present disclosure. Step 62 comprises providing an overlap record and a disparity record corresponding to each source edge pixel in a source edge image, and setting default values of the overlap record and the disparity record to 0 and −1, respectively. A goal of the embodiment is that the overlap record corresponding to a source edge pixel is for recording a maximum among all associated overlap levels to which the source edge pixel contributes, and the disparity record corresponding to the source edge pixel is for recording an image lateral shift corresponding to the maximum overlap level. After processing all the source edge pixels, a disparity map is established from corresponding disparities, which substantially correspond the edges of the source image to positions in space.

Step 64 comprises setting the image lateral shift to 0.

Step 66 comprises identifying all overlapping pixel pairs between the source edge image and the destination edge image. As previously stated, in an embodiment, not only relative positions but also color consistencies of the edge pixels of a laterally shifted image are taken into consideration in the identification process of the edge pixel pairs.

Step 68 comprises utilizing the number of overlapping pixel pairs as a current overlap level corresponding to a current image lateral shift.

Step 70 comprises checking all overlap levels of the overlapping pixels in the source edge pixels. When it is found that the corresponding overlap record of the source edge pixel from the overlapping pixel pairs is smaller than the current overlap level, the overlap recorded is updated to the current overlap level, and the disparity corresponding to the source edge pixel is also updated to the current image lateral shift. Else, the updating process is not performed.

Step 74 comprises determining whether the image lateral shift reaches a maximum limit. Step 76 is performed when a result from Step 74 is negative to allow further increase in the image lateral shift by 1. Step 66 is performed after Step 76.

When the result from Step 74 is affirmative, Step 78 is performed to end the flow. At this point, the overlap record corresponding to each of the source edge pixels records the maximum among all associated overlap levels to which the source edge pixel contributes, and the disparity corresponding to the source edge image records the image lateral shift corresponding to the maximum overlap level.

Figure 7:
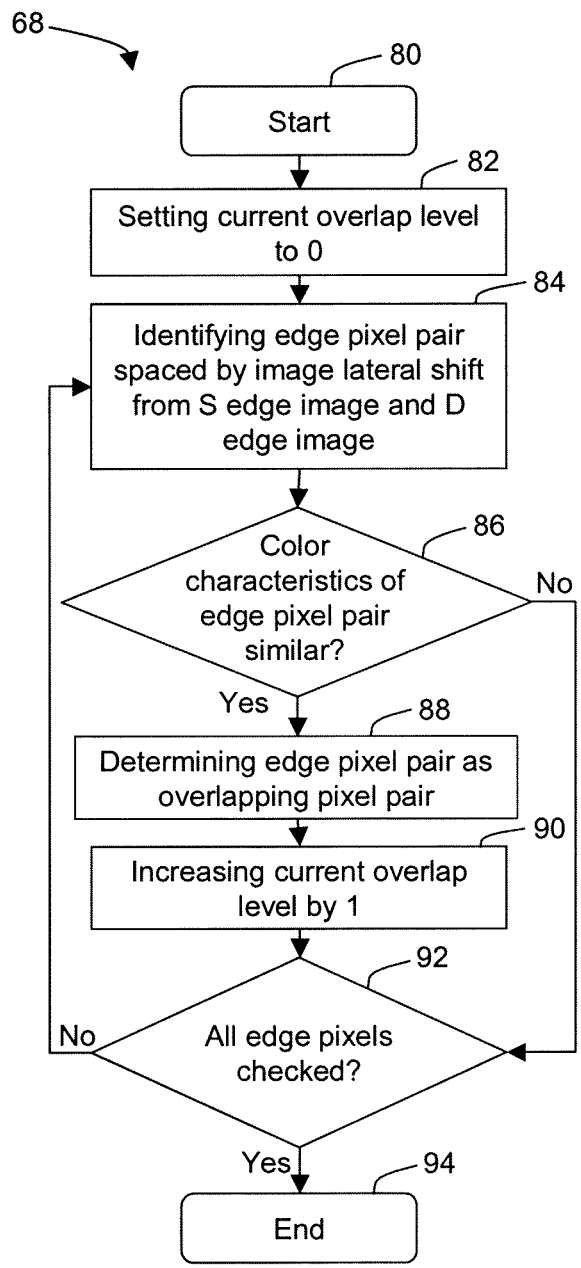
FIG. 7 is a detailed flowchart of Step 68 in FIG. 6.

FIG. 7 shows a detailed flowchart of Step 68 in FIG. 6. Step 82 comprises resetting the current overlap level to 0. Step 84 comprises identifying an edge pixel pair spaced by an image lateral shift from the source edge image and the destination edge image. From a different perspective, this step is identifying an edge pixel pair overlapping the source edge image after the destination edge image is laterally shifted by an image lateral shift. Step 86 comprises examining whether two color characteristics corresponding to the edge pixels are similar. Details of the color characteristics are as described with reference to FIG. 5 and shall be omitted here for brevity. When the two color characteristics corresponding to the edge pixels are similar, it is determined in Step 88 that the edge pixels are an overlapping pixel pair, and the current overlap level is increased by 1 in Step 90. In Step 92, when there are more edge pixels to be determined for edge pixel pairs, the method iterates Step 84. When all the edge pixels are determined for edge pixel pairs, the current overlap level is regarded as the number of overlapping pixel pairs.

Figure 8:
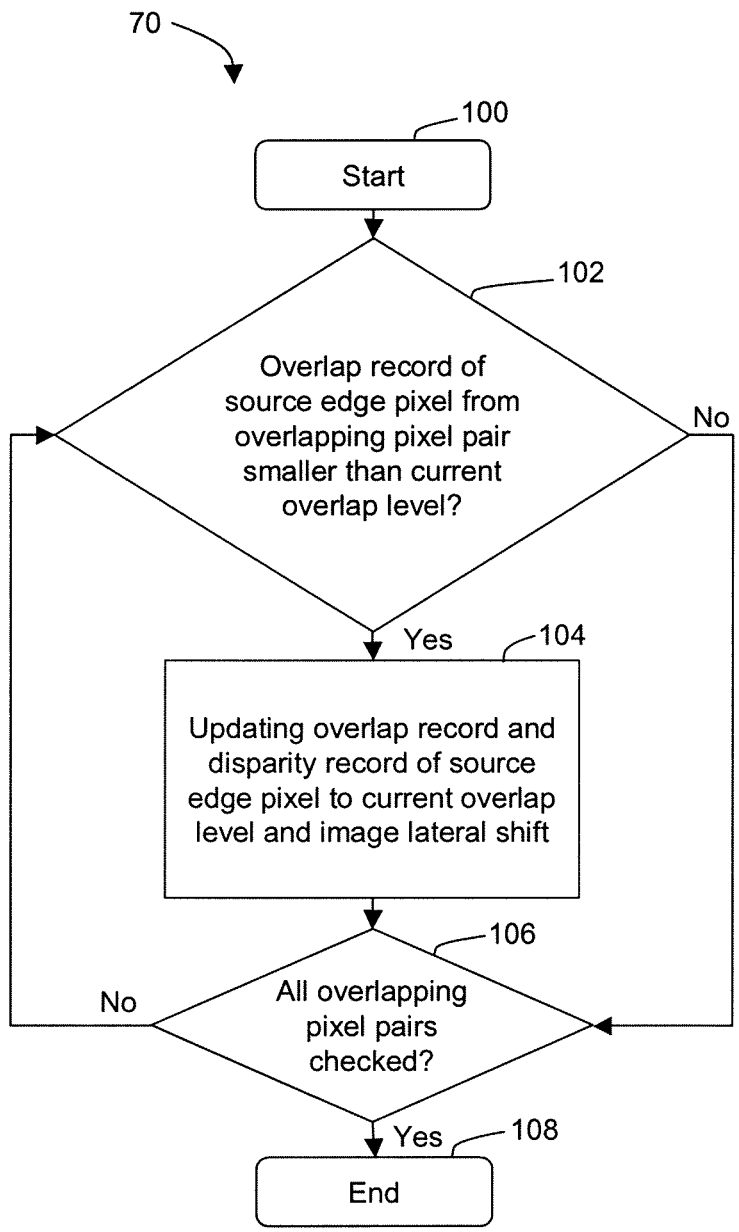
FIG. 8 is a detailed flowchart of Step 70 in FIG. 6.

FIG. 8 shows a detailed flowchart of Step 70 in FIG. 6 to illustrate how all overlapping pixel pairs are checked, and how the overlap record and the disparity record of a source edge image are updated.

Step 100 comprises an initial start step. Step 102 comprises determining whether the overlap record of the source edge pixel from the overlapping pixel pair is smaller than the current overlap level. If not, Step 106 is performed. If the result of Step 102 is affirmative, then Step 104 is performed and comprises updating the overlap record and disparity record of the source edge pixel to the current overlap level and image lateral shifting. Step 106 is then performed in which it is determined whether all overlapping pixel pairs have been checked. If not, Step 102 is performed again. Else, the process ends with Step 108.

In the method according to an embodiment of the present disclosure, the final disparity record of the source edge pixel is the disparity of the pixel. Disparities of other non-edge pixels may not be necessarily calculated or may be obtained through interpolation based on actual requirements.

In an embodiment, only four images are needed for computations—two monochromatic images and two edge images. The determination for overlapping pixels only involves checking relative positions and color similarities of two edge pixels, and the overlap level is calculated by only accumulating the number of overlapping pixel pairs. Therefore, according to an embodiment of the present disclosure, a disparity of an edge pixel in a source edge image is obtained through an extremely small amount of computations.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A processing method for a pair of stereo images, the stereo images comprising a source image and a destination image, the source image comprising a plurality of source pixels and the destination image comprising a plurality of destination pixels, the processing method comprising:
   determining a plurality of source key pixels having a key characteristic in the source image;
   determining a plurality of destination key pixels having the key characteristic in the destination image;
   providing a plurality of overlap records and a plurality of disparity records associated with the source key pixels;
   sequentially identifying a plurality of overlap levels between the source image and the destination image for a plurality of image lateral shifts, each image lateral shift having a corresponding overlap level;
   updating the disparity record and the overlap record of a selected key pixel to a most-likely disparity and a maximum overlap level;
   extracting an edge image comprising a plurality of edge pixels from the source image as the source key pixels; and
   increasing source pixels within a predetermined range neighboring the edge pixels to serve as the source key pixels,
   wherein, the selected key pixel is selected from the source key pixels, the maximum overlap level is a maximum among a plurality of associated overlap levels associated with the selected key pixel, and the most-likely disparity corresponds to the maximum overlap level.

2. The processing method according to claim 1, wherein each of the source pixels comprises a plurality of sets of color information, and the step of determining the source key pixels comprises determining the source key pixels according to one of the sets of the color information.

3. The processing method according to claim 1, wherein a first image lateral shift corresponds to a first overlap level, and a step of identifying the first overlap level comprises:
   determining a plurality of overlapping pixels pairs, each overlapping pixel pair comprising a first source key pixel and a first destination key pixel spaced from each other by the first image lateral shift, a color characteristic of the first source key pixel being similar to a color characteristic of the first destination pixel; and
   generating the first overlap level according to a number of the overlapping pixel pairs.

4. The processing method according to claim 3, wherein the step of determining the overlapping pixel pairs comprises:
   determining the color characteristic of the first source key pixel according to colors of source pixels within a predetermined range neighboring the first source key pixel; and
   determining the color characteristic of the first destination key pixel according to colors of destination pixels within the predetermined range neighboring the first destination key pixel.

5. The processing method according to claim 1, wherein each of the overlap levels is not greater than a sum of the source key pixels.

6. The processing method according to claim 1, wherein each of the overlap levels is substantially determined according to the source key pixels and the destination key pixels.

7. A processing method for a pair of stereo images, comprising:
- extracting a pair of edge images from the pair of stereo images, each edge image comprising a plurality of edge pixels, each edge pixel of one of the edge images being associated with an overlap record and a disparity record;
- obtaining a plurality of overlap levels between the pair of edge images;
- updating the disparity record and the overlap record of a selected edge pixel to a most-likely disparity and a maximum overlap level, the selected edge pixels being selected from the edge pixels, the maximum overlap level being a maximum among a plurality of associated overlap levels associated with the selected edge pixel, the most-likely disparity corresponding to the maximum overlap level; and
- expanding the edge images to update the edge images by increasing the number of edge pixels neighboring the plurality of edge pixels.

8. The processing method according to claim 7, wherein a first image lateral shift corresponds to a first overlap level, and a method of identifying the first overlap level comprises:
- determining from the pair of edge images a plurality of overlapping pixels pairs, each overlapping pixel pair corresponding to a first image pixel in one of the pair of edge images and a second image pixel in an other of the pair of edge images, the first image pixel and the second image pixel being spaced from each other by the first image lateral shift, a color characteristic of the first image pixel being similar to a color characteristic of the second image pixel; and
- determining the first overlap level according to a number of the overlapping pixel pairs.

9. The processing method according to claim 7, wherein a selected edge pixel corresponds to a selected image pixel in one of the pair of stereo images, and a method for generating a selected color characteristic corresponding to a selected edge pixel comprises:
- determining the selected color characteristic according to colors of the selected image pixel and image pixels within a predetermined range neighboring the selected image pixel.

* * * * *